US012693382B2

(12) United States Patent
Jones et al.

(10) Patent No.: US 12,693,382 B2
(45) Date of Patent: Jul. 28, 2026

(54) STRUCTURE-BASED ADAPTIVE RADAR PROCESSING FOR JOINT INTERFERENCE CANCELLATION AND SIGNAL ESTIMATION

(71) Applicant: University of Kansas, Lawrence, KS (US)

(72) Inventors: Christian Curtis Jones, Manhattan, KS (US); Lumumba Harnett, Lawrence, KS (US); Charles Andrew Mohr, Beavercreek, OH (US); Shannon David Blunt, Shawnee, KS (US)

(73) Assignee: University of Kansas, Lawrence, KS (US)

( * ) Notice: Subject to any disclaimer, the term of this patent is extended or adjusted under 35 U.S.C. 154(b) by 525 days.

(21) Appl. No.: 17/682,973

(22) Filed: Feb. 28, 2022

(65) Prior Publication Data

US 2022/0404466 A1     Dec. 22, 2022

Related U.S. Application Data

(60) Provisional application No. 63/154,574, filed on Feb. 26, 2021.

(51) Int. Cl.
*G01S 7/41* (2006.01)

(52) U.S. Cl.
CPC .................................... *G01S 7/414* (2013.01)

(58) Field of Classification Search
CPC .. G01S 13/84; G01S 13/5244; G01S 13/5242; G01S 13/9029

(Continued)

(56) References Cited

U.S. PATENT DOCUMENTS

| | | | | | |
|---|---|---|---|---|---|
| 3,735,400 A | * | 5/1973 | Sletten | ................ | G01S 13/9023 |
| | | | | | 342/25 B |
| 3,952,302 A | * | 4/1976 | Mullins | ............... | G01S 13/5242 |
| | | | | | 342/202 |

(Continued)

FOREIGN PATENT DOCUMENTS

| | | | | | |
|---|---|---|---|---|---|
| DE | 102015120733 B4 | * | 11/2017 | .......... | G01S 7/4056 |
| EP | 2767848 A1 | * | 8/2014 | .......... | G01S 13/876 |
| EP | 3611538 A1 | * | 2/2020 | .......... | G01S 7/4052 |

OTHER PUBLICATIONS

Blunt, S. D. et al., "Adaptive pulse compression via MMSE estimation," IEEE Transactions on Aerospace and Electronic Systems, vol. 42, No. 2, pp. 572-584, Apr. 2006, doi: 10.1109/TAES. 2006.1642573.

(Continued)

*Primary Examiner* — Nuzhat Pervin
(74) *Attorney, Agent, or Firm* — Riverside Law LLP

(57) ABSTRACT

The present application provides techniques for reducing noise in sensor-based systems, such as radar systems. In particular, techniques referred to background supplemental cancellation (BaSC) and background supplemental loading (BaSL) are disclosed and facilitate improved detection of moving targets in certain types of radar systems, such as radar systems based on Reiterative minimum-mean square error (RMMSE) estimation formulations. The BaSC technique may utilize a hard cancellation, where clutter cancellation is performed prior to estimation, while the BaSL technique may utilize a "soft" cancellation technique whereby clutter cancellation is performed jointly with estimation. The clutter cancellation provided via the BaSC and BaSL techniques improves the accuracy of the radar system with respect to performing target detection.

12 Claims, 13 Drawing Sheets

(58) Field of Classification Search
USPC .......................................................... 342/125
See application file for complete search history.

(56) References Cited

U.S. PATENT DOCUMENTS

| | | | | |
|---|---|---|---|---|
| 4,450,446 A * | 5/1984 | Clancy | ................ | G01S 13/5244 |
| | | | | 342/159 |
| 4,719,466 A * | 1/1988 | Farina | ................. | G01S 13/5244 |
| | | | | 702/191 |
| 5,061,934 A * | 10/1991 | Brown | ................ | G01S 13/5244 |
| | | | | 342/162 |
| 5,539,412 A * | 7/1996 | Mendelson | ............ | G01R 23/16 |
| | | | | 324/76.19 |
| 5,748,140 A * | 5/1998 | Schober | ................ | G01S 13/726 |
| | | | | 342/162 |
| 5,781,149 A * | 7/1998 | Long | ................... | G01S 13/5246 |
| | | | | 342/159 |
| 6,400,306 B1 * | 6/2002 | Nohara | ............... | G01S 13/9029 |
| | | | | 342/25 R |
| 6,747,593 B1 * | 6/2004 | Jaffer | .................... | G01S 13/003 |
| | | | | 342/159 |
| 6,809,681 B1 * | 10/2004 | Niechayev | ............ | G01S 13/582 |
| | | | | 342/159 |
| 6,822,606 B2 * | 11/2004 | Ponsford | ................... | G01S 3/74 |
| | | | | 342/159 |
| 6,940,450 B2 * | 9/2005 | Blunt | .................... | G01S 13/284 |
| | | | | 342/134 |
| 7,106,250 B2 * | 9/2006 | Blunt | .................... | G01S 7/2921 |
| | | | | 342/134 |
| 7,439,906 B1 * | 10/2008 | Blunt | .................... | G01S 13/904 |
| | | | | 342/134 |
| 7,535,412 B1 * | 5/2009 | Blunt | .................... | G01S 7/2921 |
| | | | | 342/25 R |
| 8,254,344 B2 * | 8/2012 | Akita | .................... | H04W 48/12 |
| | | | | 370/336 |
| 8,370,090 B2 * | 2/2013 | Bevan | ................. | G01S 5/02521 |
| | | | | 702/57 |
| 8,559,554 B2 * | 10/2013 | Vossiek | ................ | H04B 1/7174 |
| | | | | 375/259 |
| 8,970,426 B1 * | 3/2015 | Stockmann | ......... | G01S 13/5244 |
| | | | | 342/159 |
| 9,173,187 B2 * | 10/2015 | Moshfeghi | ............ | H04W 64/00 |
| 9,551,786 B2 * | 1/2017 | Seller | ...................... | G01S 13/74 |
| 9,559,417 B1 * | 1/2017 | Schwarzwalder | ... | H01Q 3/2605 |
| 9,971,027 B1 * | 5/2018 | Stockmann | ......... | G01S 13/5244 |
| 10,142,778 B2 * | 11/2018 | Banerjea | ................. | H04W 4/80 |
| 10,775,478 B2 * | 9/2020 | Davis | .................... | G01S 13/931 |
| 11,209,523 B2 * | 12/2021 | Meissner | ................ | G01S 13/53 |
| 11,343,818 B2 * | 5/2022 | Wang | .................... | G01S 5/0226 |
| 11,506,776 B2 * | 11/2022 | Cho | ....................... | G01S 13/931 |
| 11,513,187 B2 * | 11/2022 | Stettiner | ................. | G01S 7/356 |
| 2003/0142011 A1 * | 7/2003 | Abramovich | ......... | G01S 7/4021 |
| | | | | 342/162 |
| 2006/0109161 A1 * | 5/2006 | Krikorian | ........... | G01S 13/9019 |
| | | | | 342/25 R |
| 2006/0181451 A1 * | 8/2006 | Samson, Jr. | .......... | G01S 7/2813 |
| | | | | 342/195 |
| 2006/0273951 A1 * | 12/2006 | Adams | .................... | G01S 7/282 |
| | | | | 342/194 |
| 2007/0167791 A1 * | 7/2007 | Umemura | .......... | G01S 15/8981 |
| | | | | 600/455 |
| 2008/0106460 A1 * | 5/2008 | Kurtz | ...................... | G01S 13/34 |
| | | | | 342/99 |
| 2008/0111731 A1 * | 5/2008 | Hubbard | .............. | G01S 13/872 |
| | | | | 342/160 |
| 2009/0177091 A1 * | 7/2009 | Umemura | .............. | A61B 8/488 |
| | | | | 600/455 |
| 2014/0225762 A1 * | 8/2014 | Seller | .................... | G01S 13/876 |
| | | | | 342/125 |
| 2014/0276031 A1 * | 9/2014 | Lomnitz | .............. | A61B 5/4312 |
| | | | | 600/430 |
| 2016/0003940 A1 * | 1/2016 | Seller | ........................ | G01S 7/40 |
| | | | | 342/132 |
| 2016/0094270 A1 * | 3/2016 | Seller | .................... | H04J 3/0608 |
| | | | | 375/139 |
| 2016/0170019 A1 * | 6/2016 | Owirka | ............... | G01S 13/9029 |
| | | | | 342/25 B |
| 2016/0191163 A1 * | 6/2016 | Preston | ................... | G01L 1/242 |
| | | | | 398/16 |
| 2016/0261306 A1 * | 9/2016 | Seller | ...................... | G01S 5/021 |
| 2017/0276779 A1 * | 9/2017 | Seller | ...................... | G01S 13/84 |
| 2017/0324441 A1 * | 11/2017 | Seller | .................... | G01S 5/0246 |
| 2018/0006680 A1 * | 1/2018 | Seller | ............... | H04L 27/26522 |
| 2018/0031697 A1 * | 2/2018 | Harris | .................... | G01S 7/023 |
| 2020/0191940 A1 * | 6/2020 | Wu | ........................ | G01S 13/931 |
| 2021/0286067 A1 * | 9/2021 | Harnett | .................. | G01S 7/414 |
| 2022/0349991 A1 * | 11/2022 | Owen | .................... | G01S 13/26 |

OTHER PUBLICATIONS

Jones, C. C. et al., "Structure-Based Adaptive Radar Processing for Joint Clutter Cancellation and Moving Target Estimation," 2020 IEEE International Radar Conference (RADAR), 2020, pp. 413-418, doi: 10.1109/RADAR42522.2020.9114609.

* cited by examiner

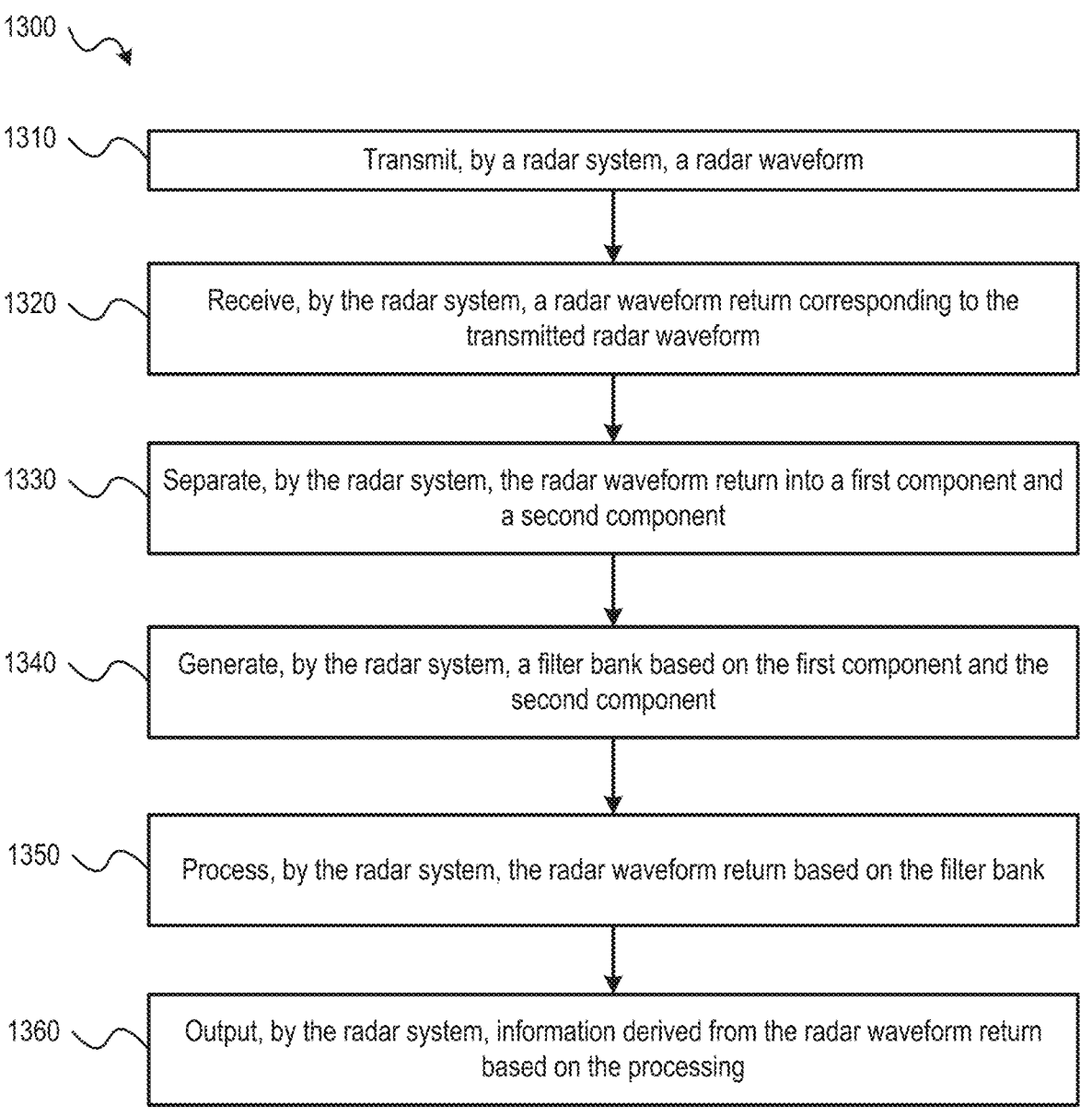

1300

1310 — Transmit, by a radar system, a radar waveform

1320 — Receive, by the radar system, a radar waveform return corresponding to the transmitted radar waveform 1330 — Separate, by the radar system, the radar waveform return into a first component and a second component 1340 — Generate, by the radar system, a filter bank based on the first component and the second component 1350 — Process, by the radar system, the radar waveform return based on the filter bank 1360 — Output, by the radar system, information derived from the radar waveform return based on the processing

FIG. 13

STRUCTURE-BASED ADAPTIVE RADAR PROCESSING FOR JOINT INTERFERENCE CANCELLATION AND SIGNAL ESTIMATION

CROSS-REFERENCE TO RELATED APPLICATIONS

This application claims the benefit of priority from U.S. Provisional Application No. 63/154,574 filed Feb. 26, 2021 and entitled "STRUCTURE-BASED ADAPTIVE RADAR PROCESSING FOR JOINT INTERFERENCE CANCELLATION AND SIGNAL ESTIMATION," the disclosure of which is incorporated by reference herein in its entirety.

GOVERNMENT INTEREST

This invention was made with government support under Contract No. N00014-16-C-2029 awarded by the Office of Naval Research. The government has certain rights in the invention.

TECHNICAL FIELD

The present disclosure relates to sensor systems and more specifically to improved techniques for removing cancelling clutter in radar systems.

BACKGROUND

Systems that utilize sensors to compile or collect data for analysis are becoming more widespread. For example, sensors (e.g., proximity sensors, cameras, radar systems, etc.) have been increasingly added to vehicles to improve their capabilities and safety (e.g., backup cameras, collision detection and avoidance, proximity detection, and the like). The data collected by sensors in such systems may be subject to noise and interference, the presence of which may hinder the effectiveness of the systems that rely on the sensors to provide data for analysis. As one example, radar systems are a form of sensor-based system that may be used to collect information about moving targets in an environment. To illustrate, the radar system may transmit radar waveforms and receive back radar returns (e.g., reflections of the transmitted radar waveforms). The radar waveform returns may be subjected to various processes (e.g., clutter cancellation) to eliminate signal dependent interference and improve the accuracy of the targets detected within an area monitored by the radar system. Regardless of the type of sensor-based system, the ability to cancel or reduce the impact of interference present in the sensor data may result in improved performance of that system and increase the sensor system's accuracy and reliability.

Reiterative minimum-mean square error (RMMSE) estimation, as described in S. D. Blunt, K. Gerlach, "Adaptive pulse compression via MMSE estimation," *IEEE Trans. Aerospace & Electronic Systems*, vol. 42, no. 2, pp. 572-584, April 2006, provides a formulation for pulse compression in which the pulse compression filter for each individual range cell is adaptively estimated from the received radar waveforms in order to mitigate the masking interference resulting from matched filtering in the vicinity of large targets. RMMSE was initially developed based on the goal of applying strategies from code division multiple access (CDMA) multiuser detection, where users are separated at the receiver according to their corresponding code, to the application of shared-spectrum multistatic radar. It was then observed that when RMMSE is applied to radar pulse compression, denoted as adaptive pulse compression (APC), it facilitates a beamforming-like capability by nulling the self-interference from range sidelobes. The multistatic APC (MAPC) application quickly followed, along with ways to perform this manner of adaptive processing in legacy systems after analog pulse compression, adaptive compensation of pulse eclipsing effects, exploitation of fast-time Doppler to perform imaging, and compensation of Doppler distortion. Additional modifications were subsequently developed, such as incorporation of a gain constraint, hybridization using the CLEAN technique, reduced-dimension implementation (e.g., to reduce computational cost), and joint range-Doppler and range-angle versions. An RMMSE-based spatial beamformer denoted as reiterative super-resolution (RISR) was also developed for spatial direction-of-arrival (DOA) estimation, though it is likewise applicable to the frequency domain. To provide enhanced robustness, gain constrained and "partially constrained" versions of RISR were subsequently developed.

These various forms of RMMSE have been used to enhance weather radar, synthetic aperture radar (SAR), magnetoencephalography (MEG) imaging of brain activity, and active sonar, where the latter also incorporated a covariance matrix taper to address high Doppler sensitivity. More recently, physical attributes of waveforms have been incorporated into the RMMSE paradigm that have subsequently permitted experimental demonstrations of enhanced sensitivity and discrimination for simultaneously dual-polarized operation, shared-spectrum radar, and even stretch processing.

While the above-described variations for RMMSE have improved upon the original RMMSE formulation, additional challenges remain, especially for certain applications. For example, moving target indication (MTI) radars disambiguate targets in the presence of clutter using Doppler as the discriminant. Doing so necessitates estimation and subsequent cancellation of the clutter because it could otherwise mask the presence of moving targets, in some cases to a rather significant degree. While the above-described RMMSE techniques may provide an effective technique for estimation of a received radar waveform, clutter cancellation remains a challenge.

SUMMARY

The present application discloses techniques for improving detection of targets of interest in sensor-based systems, such as radar systems. As a non-limiting example, embodiments of the present disclosure may be used to improve clutter cancellation for RMMSE-based radar system, thereby improving the detection of targets of interest in a monitored area. Aspects of the present disclosure may incorporate clutter cancellation algorithms, referred to as background supplemental cancellation (BaSC) and background supplemental loading (BaSL), that achieve sequential or joint clutter cancellation and signal estimation. The signal estimation properties of the BaSC and BaSL algorithms may facilitate enhanced discrimination and visibility of moving targets without signal-to-noise ratio (SNR) loss or resolution degradation otherwise associated with Doppler tapering. The BaSC approach may be configured employ "hard" cancellation (e.g., sequential clutter cancellation and signal estimation) and the BaSL approach represents a form of "soft" cancellation (e.g., joint clutter cancellation and signal estimation).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein:

FIG. 13 is a flow diagram of an exemplary method for performing radar signal processing in accordance with the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
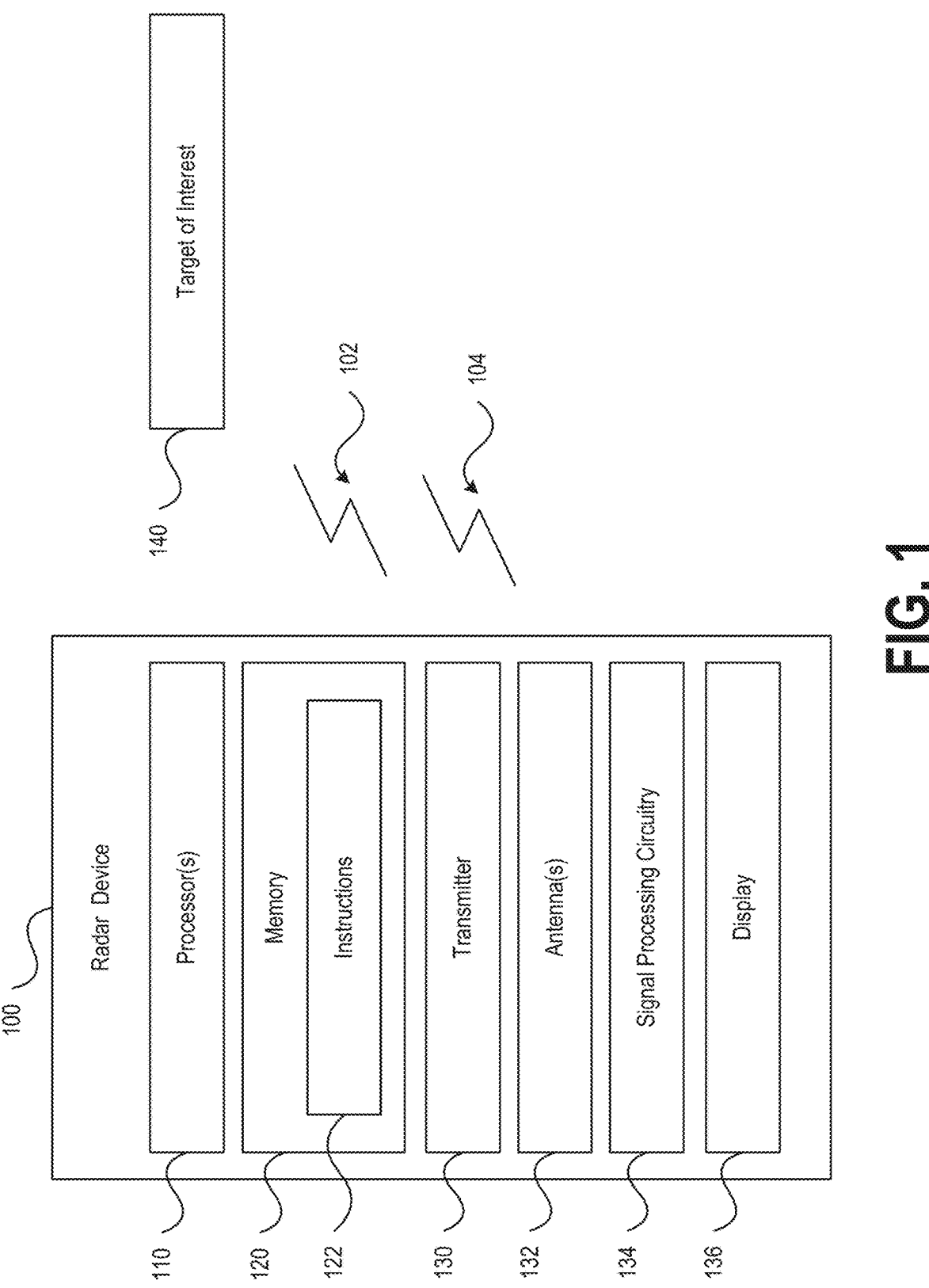
FIG. 1 is a block diagram of a sensor-based system in accordance with the present disclosure.

Referring to FIG. 1, a block diagram of a sensor-based system in accordance with the present disclosure in accordance with the present disclosure is shown. As shown in FIG. 1, the system includes a radar device 100 having one or more processors 110, a memory 120, a transmitter 130, one or more antennas 132, signal processing circuitry 134, and a display device 136. The one or more processors 110 may include one or more central processing units (CPUs), digital signal processors (DSPs), application specific integrated circuits (ASICs), field programmable gate arrays (FPGAs), or other circuitry configured to process data in accordance with aspects of the present disclosure. The transmitter 130 may be configured to generate a radar waveform for transmission. The one or more antennas 132 may be configured to receive radar waveform returns (e.g., reflections of transmitted radar waveforms). In an aspect, the one or more antennas 132 may include an antenna array. The signal processing circuitry 134 may include various signal processing components, such as amplifiers, analog-to-digital converters, phase locked loops, mixers, a detector, a diplexer, gain control circuitry, low noise amplifiers (LNAs), other types of signal processing circuitry, or a combination thereof. It is noted that the exemplary types of signal processing circuitry described above have been provided for purposes of illustration, rather than by way of limitation and that the specific components of a radar detection system configured in accordance with the present disclosure may include less signal processing components, more signal processing components, or different signal processing components depending on the particular configuration or design of the radar detection system. The display device 136 may be configured to display radar data associated with detection of targets of interest (e.g., ground moving targets, etc.), such as target of interest 140.

As shown in FIG. 1, the memory 120 may store instructions 122 that, when executed by the one or more processors 110, cause the one or more processors 110 to perform operations to detect moving targets in accordance with the concepts disclosed herein. For example, the instructions 122 may correspond to software that, when executed by the one or more processors 110, causes the one or more processors 110 to perform moving target detection utilizing techniques to process the radar waveform returns. As described in more detail below, the processing of radar waveform returns in accordance with the present disclosure may include performing clutter cancellation in accordance with the concepts disclosed herein. More particularly, embodiments of the present disclosure provide techniques for processing radar waveform returns that incorporate clutter cancellation capabilities. The disclosed techniques are denoted as background supplemental cancellation (BaSC) and background supplemental loading (BaSL), respectively. The BaSC and BaSL techniques disclosed herein may be applied to or incorporated into other radar processing techniques, such as one or more of the above-described RMMSE formulations.

As explained above, an adaptive filter bank may be obtained based on the RMMSE framework and utilized to perform DOA estimation using a single snapshot (e.g., using RISR) from an arbitrary antenna array, as long as the array manifold is adequately known. The RISR formulation briefly mentioned above includes means to incorporate array calibration tolerances (e.g., since the array manifold cannot be known perfectly in practice). By considering the spatial steering vectors to instead be frequency steering vectors, RISR can likewise be directly applied to spectrum estimation. To provide a better understanding of the clutter cancellation techniques provided by the BaSL and BaSC techniques disclosed herein, a brief review of the RISR formulation is described below, which will subsequently be modified to incorporate clutter cancellation in accordance with embodiments of the present disclosure.

To provide an overview of the RISR formulation, let the above-mentioned single snapshot be represented by a single vector y comprised of N time samples for which an estimate of the spectral content is to be obtained. The received signal can thus be represented as:

$$y = Sx + v, \qquad (1)$$

where x is an M×1 vector comprised of M≫N frequency-dependent complex amplitudes, S is an N×M bank of frequency steering vectors, and v is additive noise of arbitrary distribution. In traditional RMMSE a matched filter (MF) estimate may be smeared because the mapping between x and y is not 1-to-1 since M≫N. The importance noting the single-snapshot capability will be revealed shortly when the approach is employed in nonstationary applications.

Keeping in mind the context of Equation (1), an objective function may be minimized, where the objective function is expressed as:

$$J = \mathbb{E}\left[\left\| x - W^H y \right\|^2 \right], \qquad (2)$$

where $(\cdot)^H$ is the Hermitian operation, $\mathbb{E}[\cdot]$ is expectation, and W is the resulting N×M adaptive filter bank. The general minimum mean-square error (MMSE) solution to Equation (2) can be expressed as:

$$W = \left( \mathbb{E}\left[ yy^H \right] \right)^{-1} \mathbb{E}\left[ yx^H \right], \qquad (3)$$

for which the mth column in the (unconstrained) RMMSE context is the RISR filter, given by:

$$w_{m,i} = p_{m,i} \left( SP_i S^H + R_{nse} \right)^{-1} s_m, \qquad (4)$$

for $s_m$ the mth column of S, and $R_{nse}$ is the N×N noise covariance matrix. An M×M diagonal matrix, expressed as:

$$P_i = \left[ \hat{x}_i \hat{x}_i^H \right] \odot I_{M \times M}, \qquad (5)$$

can then be obtained at the ith iteration and has the mth diagonal element $p_{m,i}$, where $I_{M \times M}$ is an identity matrix, and $$\hat{x}_i = W_i^H y, \qquad (6)$$

is the estimate of the complex spectral amplitudes at the ith iteration, and $\odot$ is the Hadamard product. The RISR filter may be initialized by setting $$W_{i=0} = S, \qquad (7)$$

which performs a Fourier transform that may be over-sampled in the frequency domain since S is N×M.

The RISR filter bank of Equation (4) may be modified to incorporate a gain constraint for each individual filter, with the resulting mth column of W subsequently taking the minimum variance distortionless response (MVDR) form of:

$$w_{m,i} = \frac{\left( SP_i S^H + R_{nse} \right)^{-1} s_m}{s_m^H \left( SP_i S^H + R_{nse} \right)^{-1} s_m}, \qquad (8)$$

While the formulation in Equation (8) does not achieve quite the degree of resolution enhancement as that of Equation (4), it has also been observed to be more robust to mismatch effects and avoids over-suppression of small signal components. Moreover, estimated values of x for which there is no signal component present tend to settle around the level of the noise floor when using Equation (8), which is a more realistic response and useful for subsequent constant false alarm response (CFAR) detection. It can be appreciated from the foregoing that the RISR formulation in Equation (4) or Equation (8) provides a recursive approach that seeks to obtain the filter bank that minimizes the mean-square error of the estimate of the underlying signal components according to Equation (2). However, this approach does not discriminate between the desired signal components, such as moving targets, and the undesired signal components. Although the phrase "undesired signal components" is used here to mean the stationary signal components that are persistent, in the description below the term "clutter" is used to reference such signal components. Consequently, embodiments of the present disclosure provide techniques for cancellation of clutter, which are referred to herein as background supplemental cancellation (BaSC) and background supplemental loading (BaSL), are disclosed and which may be viewed as a form of change detection relative to an estimated background. In the description that follows, the formulation based on Equation (8) will be utilized as a basis for modifications to incorporate clutter cancellation capabilities. However, it should be recognized that the exemplary techniques disclosed herein may be readily applied to formulations based on Equation (4) or other RMMSE formulations if desired.

The disclosed BaSC technique supplements the RISR estimation-oriented filter bank with a clutter cancellation component. To illustrate, the disclosed BaSC technique separates the underlying signal (i.e., received radar waveform returns 104) into two parts as $x = x_{clut} + x_{rem}$ in which the first component, $x_{clut}$, denotes clutter (stationary background) and the second component, $x_{rem}$ denotes whatever remains (excluding noise). The noise can be statistically estimated via measurement of the ambient scene (i.e., no transmission) or using the expected noise sensor components. In general, the clutter estimate will contain noise, but the clutter power is typically much larger than the noise power for the situations in which clutter cancellation would be employed. Separation of the underlying signal components in this manner may be achieved by first decomposing Equation (1) as:

$$y = Sx + v \tag{9}$$
$$= Sx_{clut} + Sx_{rem} + v$$
$$= y_{clut} + y_{rem} + v,$$

The form shown in Equation (9) allows for the presence or absence of moving targets since $x_{rem}$ could be a vector of zeroes.

Now define the rank k<N clutter covariance matrix as:

$$R_{clut} = \mathbb{E}\left[y_{clut}y_{clut}^H\right], \tag{10}$$

For white noise it can thus be readily shown that the inverse of the normalized cancellation transform, represented as:

$$R_{canc} = (R_{clut} + R_{nse})/\sigma_v^2 \tag{11}$$
$$= \left(R_{clut} + \sigma_v^2 I\right)/\sigma_v^2,$$

projects the signal components of Equation (9) onto the orthogonal complement of the clutter subspace while preserving the full-rank noise (ensuring invertibility). In other words, $$R_{canc}^{-1}\left(\mathbb{E}\left[yy^H\right]\right) = \mathbb{E}\left[y_{rem}y_{rem}^H\right] + \mathbb{E}\left[vv^H\right], \tag{12}$$

which implies:

$$R_{canc}^{-1}y = \tilde{y} \tag{13}$$
$$= y_{rem} + v.$$

Thus, the corresponding clutter-cancelled version of Equation (6) becomes:

$$\hat{x}_{rem,i} = W_i^H R_{canc}^{-1}y = W_i^H \tilde{y} \tag{14}$$

using either Equation (4) or Equation (8) for the RISR filter bank $W_i$, which in this case is applied and updated recursively after application of the cancellation transform.

It is noted that estimation of the clutter covariance may not be perfect and, depending on the particular problem, potentially difficult to obtain precisely (e.g., in a highly nonstationary environment). Consequently, the result in Equations (13) and (14) may still contain at least some residual clutter leakage. Moreover, the hard delineation between the clutter and remaining subspaces may hinder detection of moving targets that are near that cutoff. To that end, a soft cancellation version of the RMMSE framework is likewise examined, referred to herein as the BaSL technique, is disclosed.

Like the BaSC technique described above, the BaSL technique incorporates a clutter cancellation component into the RISR formulation described above, however, while Equation (14) and the BaSC technique described above employs a sequential cancellation-then-estimation approach, the BaSL technique performs these operations jointly. Similar to the BaSC technique, the BaSL technique begins by modifying the above-described RMMSE formulations. Specifically, the BaSL technique may begin by modifying Equation (2) as follows:

$$J = \mathbb{E}\left[\left\|x_{rem} - W^H y\right\|^2\right] \tag{15}$$

Using y from Equation (9) leads to:

$$w_{m,i} = p_{m,i}\left(SP_i S^H + R_{clut} + R_{nse}\right)^{-1}s_m, \tag{16}$$

such that the recursive estimation of the filter bank and moving targets naturally excludes the clutter that is already accounted for within the filter structure.

An MVDR form of (16) like that in (8) could likewise be obtained, though it would tend to preserve the clutter instead of canceling it. To enable cancellation we will insert the clutter covariance only into the numerator of (8) as $$w_{m,i} = \frac{\left(SP_i S^H + R_{clut} + R_{nse}\right)^{-1}s_m}{s_m^H\left(SP_i S^H + R_{nse}\right)^{-1}s_m}. \tag{17}$$

Consequently, while initial estimation via Equations (6) and (7) does include the clutter component, it will disappear from the moving target estimate as iteration continues. The filter structures of Equations (16) and (17) are collectively denoted as background supplemental loading (BaSL). As will be shown using measured data, this soft cancellation approach provides greater visibility of slow-moving targets that would otherwise be suppressed when performing hard cancellation according to the BaSC technique disclosed herein.

It is noted that the supplementary covariance matrix, expressed as:

$$R_{sup} = R_{clut} + R_{nse} \tag{18}$$

and which may be used in BaSC via Equation (11) and also appears in Equations (16) and (17) for the BaSL technique can be obtained in different ways. The most direct approach is by computing the sample covariance, given by:

$$R_{sup} \approx \frac{1}{L}\sum_{\ell=1}^{L} y_\ell y_\ell^H, \tag{19}$$

where $y_\ell$ for $\ell = 1, 2, \ldots, L$ are snapshots collected over intervals where moving targets do not reside. Of course, it is beneficial when constructing the covariance matrix that these estimates are identically distributed (or at least sufficiently similar) to the clutter and noise within the moving target interval, which is an assumption typically made for standard adaptive clutter cancellation.

Alternatively, a structured supplemental covariance could be formed by leveraging the model from Equation (9) and using the initial estimates from Equation (6) for the i=0 filterbank in Equation (7). Denoting these estimates as $\hat{x}_\ell$ for $\ell = 1, 2, \ldots, L$ snapshots, the structured supplementary matrix may be obtained via:

$$R_{sup} \approx S\hat{P}_{clut}S^H + \sigma_v^2 I \qquad (20)$$

where $$P_{clut} = \left[\frac{1}{L}\sum_{\ell=1}^{L} \hat{x}_\ell \hat{x}_\ell^H\right] \odot I_{M\times M} \qquad (21)$$

in the same form as Equation (5). While it appears a bit more cumbersome than Equation (19), this structured approach has the benefit of permitting easy removal of non-clutter components, which could otherwise contaminate the training data, by simply zeroing the necessary diagonal elements in Equation (21) that fall outside the expected clutter response. Use of both supplementary matrices is examined below.

In aspects, the above-described operations to process received radar waveform returns 104 may be performed by one or more processors (e.g., via software) or by the signal processing circuitry 134. For example, the one or more processors 110 may be configured to control signal processing circuitry 134 to generate one or more radar waveforms for transmission by the transmitter 130. The one or more radar waveforms may be transmitted as radar waveforms 102. Some of the transmitted radar waveforms 102 may be reflected by the environment, such as by the target of interest 140, and may be received at a receiver, such as antenna 132, as the one or more radar waveform returns 104. The radar waveform returns 104 may be processed by the one or more processors 110 or by the signal processing circuitry 134 in accordance with the BaSC and BaSL techniques described above.

For example, the processing of the radar waveform returns 104 may involve separating the received radar waveform returns into a clutter component and a remainder component, as described with reference to Equation (9). In a BaSC implementation, the clutter component may be used to generate a cancellation matrix (e.g., a covariance matrix, as in Equation (10)) that may be projected onto the orthogonal complement of the clutter subspace to produce a filter bank, as in Equation (14). The filter bank may then be used to perform estimation (e.g., after clutter cancellation). Alternatively, for a BaSL implementation, the filter bank may incorporate the clutter component, as in Equation (16). Cancellation of clutter may then be achieved during subsequent iterations (e.g., as the filter bank is updated based on subsequent radar waveform returns) as in Equation (17). In some aspects, a supplemental covariance matrix according to Equation (18) may also be utilized (e.g., for both BaSC and BaSL implementations), as described with reference to Equations (19)-(21).

Utilizing the BaSC and BaSL techniques described above, the radar device 100 is able to more accurately identify targets of interest, such as the target of interest 140. In particular, the radar device 100 may be based on an RMMSE estimation formulation, such as RISR, which does not traditionally include clutter cancellation capabilities. However, through use of the disclosed BaSC or BaSL techniques, the radar device 100 may mitigate the impact of clutter and more readily identify moving targets of interest, as shown in more detail below with reference to FIGS. 2-12.

In FIGS. 2-12 experimental results obtained through evaluation of BaSC and BaSL techniques are shown. The experimental results shown in FIGS. 2-12 are based on measured data from two completely separate open-air tests used to assess the efficacy of the BaSC and BaSL forms of RISR disclosed herein with respect to moving target estimation in clutter. In all cases, five iterations of the given approach were employed. The first data set involved the use of 150 random frequency modulation (FM) waveforms having a 3 dB bandwidth of 67 MHz, pulse width of 4.5 Useconds, and pulse repetition frequency (PRF) of 20 kHz implemented on a Tektronix arbitrary waveform generator at an S-band center frequency of 3.55 GHz. The waveforms were emitted in the direction of a traffic intersection in Lawrence, Kans., and the resulting echoes collected using a real-time spectrum analyzer.

Figure 2:
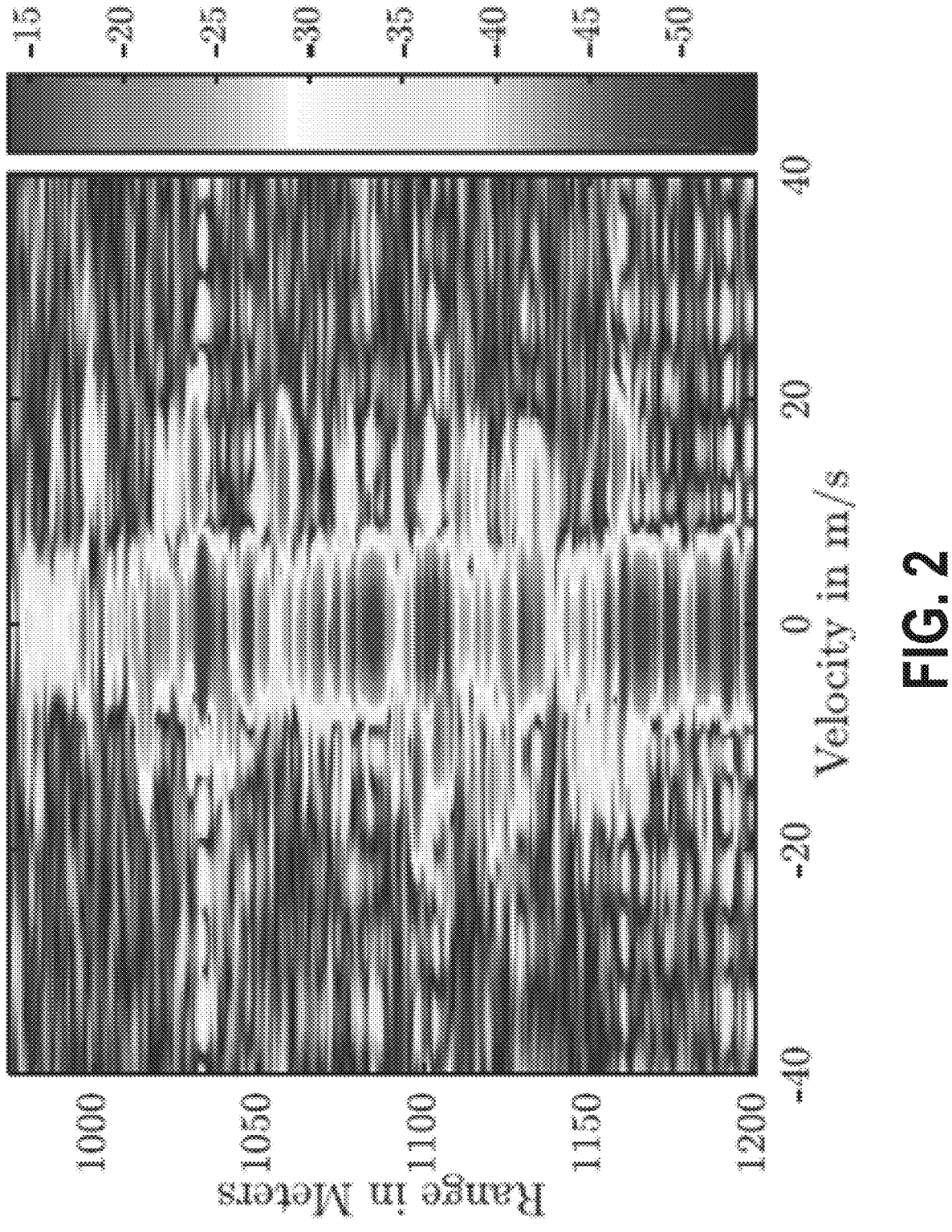
FIG. 2 shows an S-band range-Doppler response with standard FFT Doppler processing using Taylor windowing and without clutter cancellation for 150 random frequency modulation (FM) waveforms.
Figure 3:
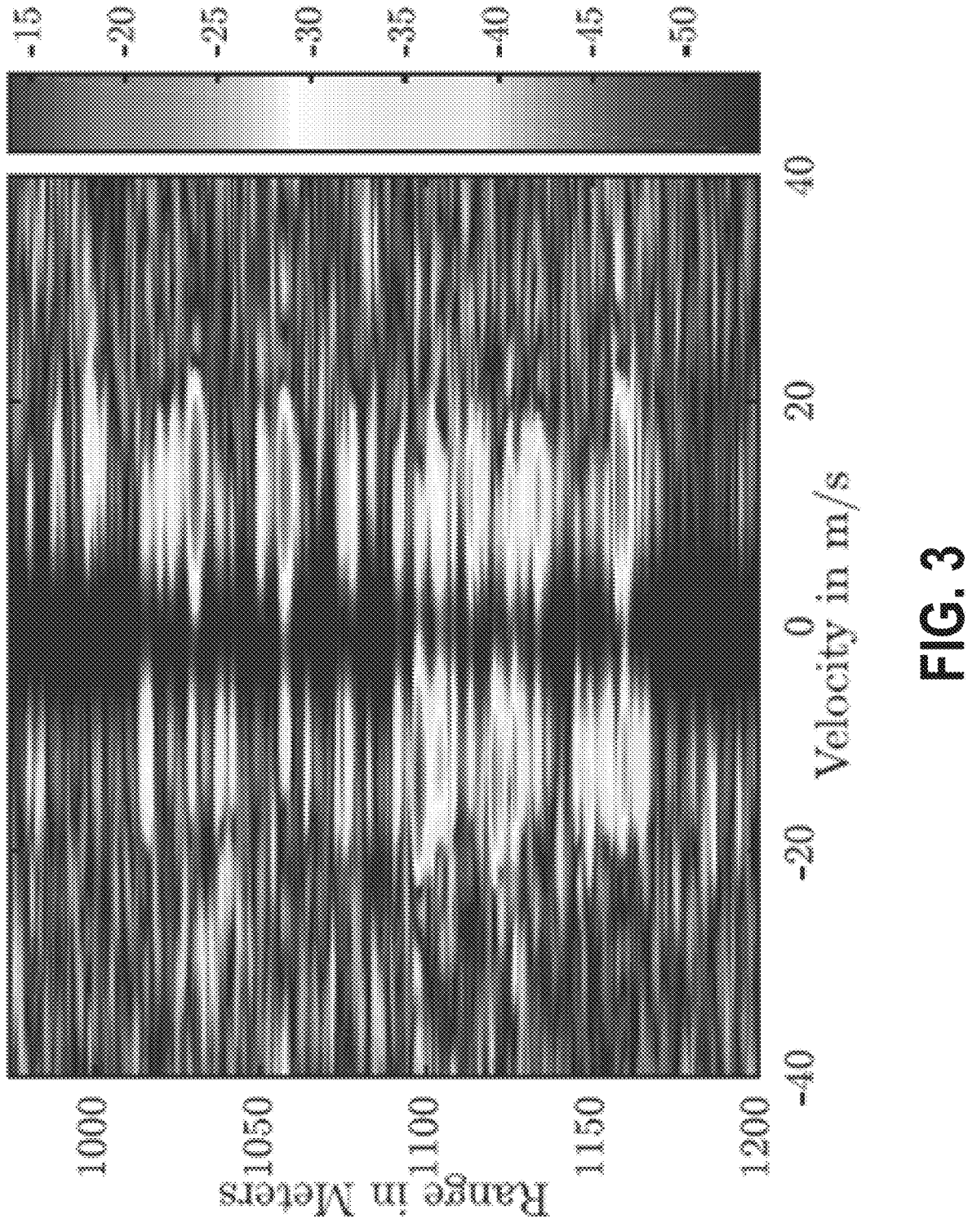
FIG. 3 shows an S-band range-Doppler response with projection-based cancellation and without adaptive estimation for 150 random FM waveforms.

In FIG. 2, standard fast Fourier transform (FFT) Doppler processing with Taylor windowing and no clutter cancellation is shown. In particular, FIG. 2 shows the S-band range-Doppler response without clutter cancellation and without adaptive estimation (FFT only) for the 150 random FM waveforms. As can be seen in FIG. 2, some moving targets appear to be visible but the large clutter response makes the moving targets hard to distinguish. Applying projection-based clutter cancellation (since the platform is stationary) to this data yields the response in FIG. 3, which is an image showing an S-band range-Doppler response with projection-based cancellation and without adaptive estimation (FFT only) for the 150 random FM waveforms. As compared to FIG. 2, the moving targets are more clearly visible in the response shown in FIG. 3, but the Doppler resolution is rather coarse.

Figure 4:
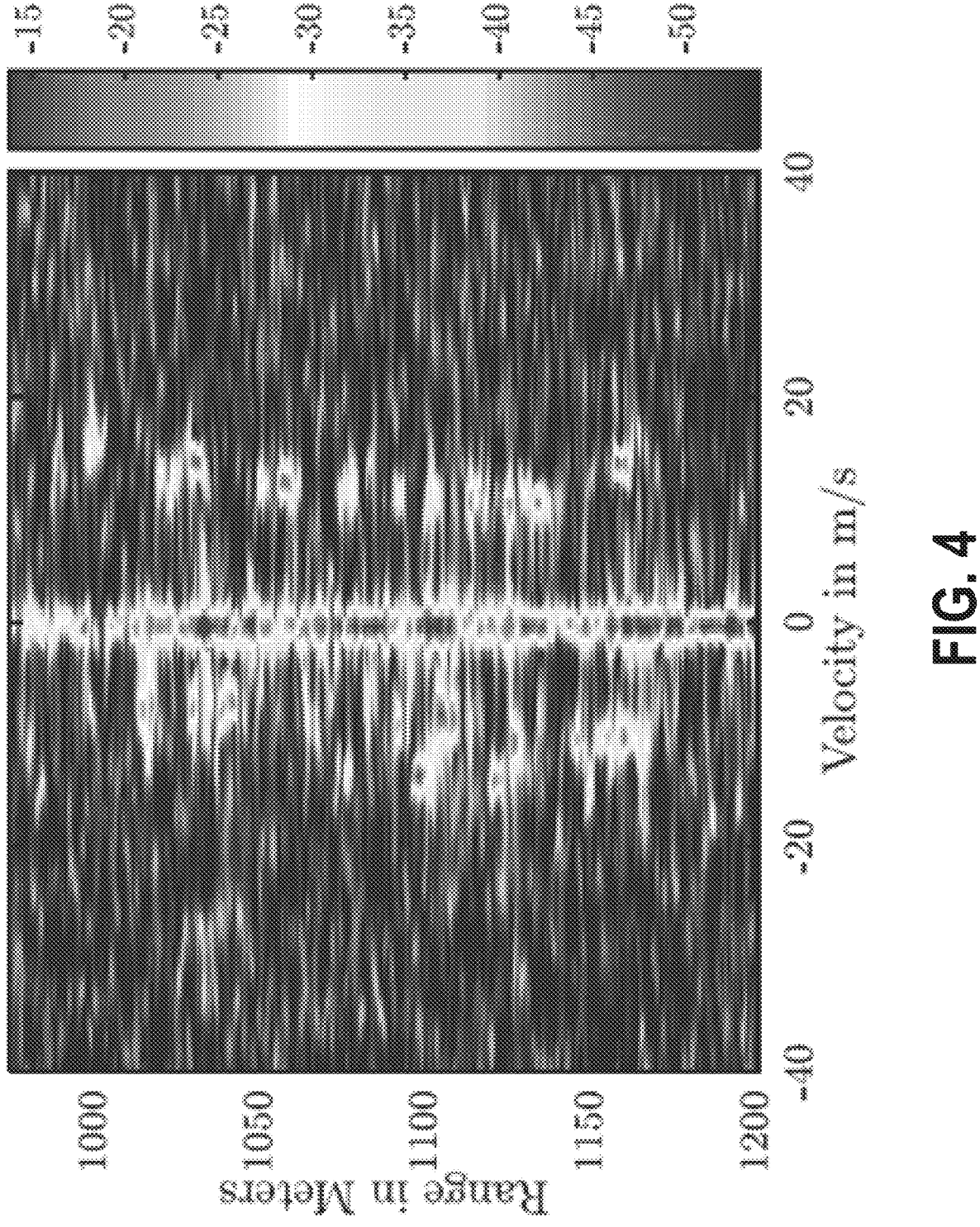
FIG. 4 shows the S-band range-Doppler response without clutter cancellation and with adaptive estimation using RISR for 150 random FM waveforms.

In FIG. 4, an image showing the S-band range-Doppler response without clutter cancellation and using RISR is shown. The particular formulation for RISR used to obtain the Doppler response shown in FIG. 4 was derived from Equation (8) and applied to the 150 random FM waveforms. As can be seen in FIG. 4, applying RISR according to Equation (8) to the same data set (see FIG. 3) provides an obviously significant sharpening in Doppler, with the moving targets becoming quite clear, but the clutter is still present and may mask some targets.

Figure 5:
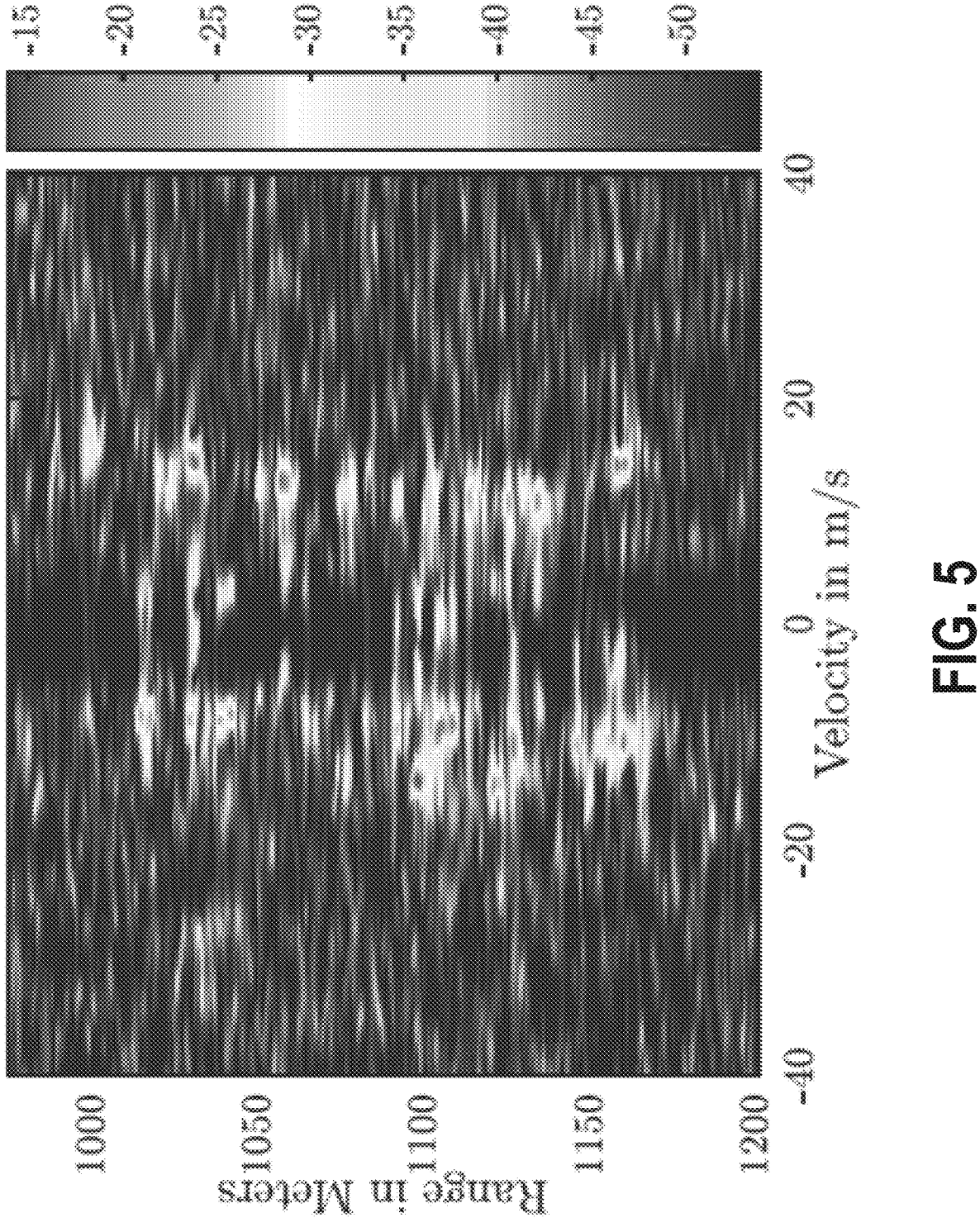
FIG. 5 shows the S-band range-Doppler response obtained using BaSC for 150 random FM waveforms in accordance with the present disclosure.
Figure 6:
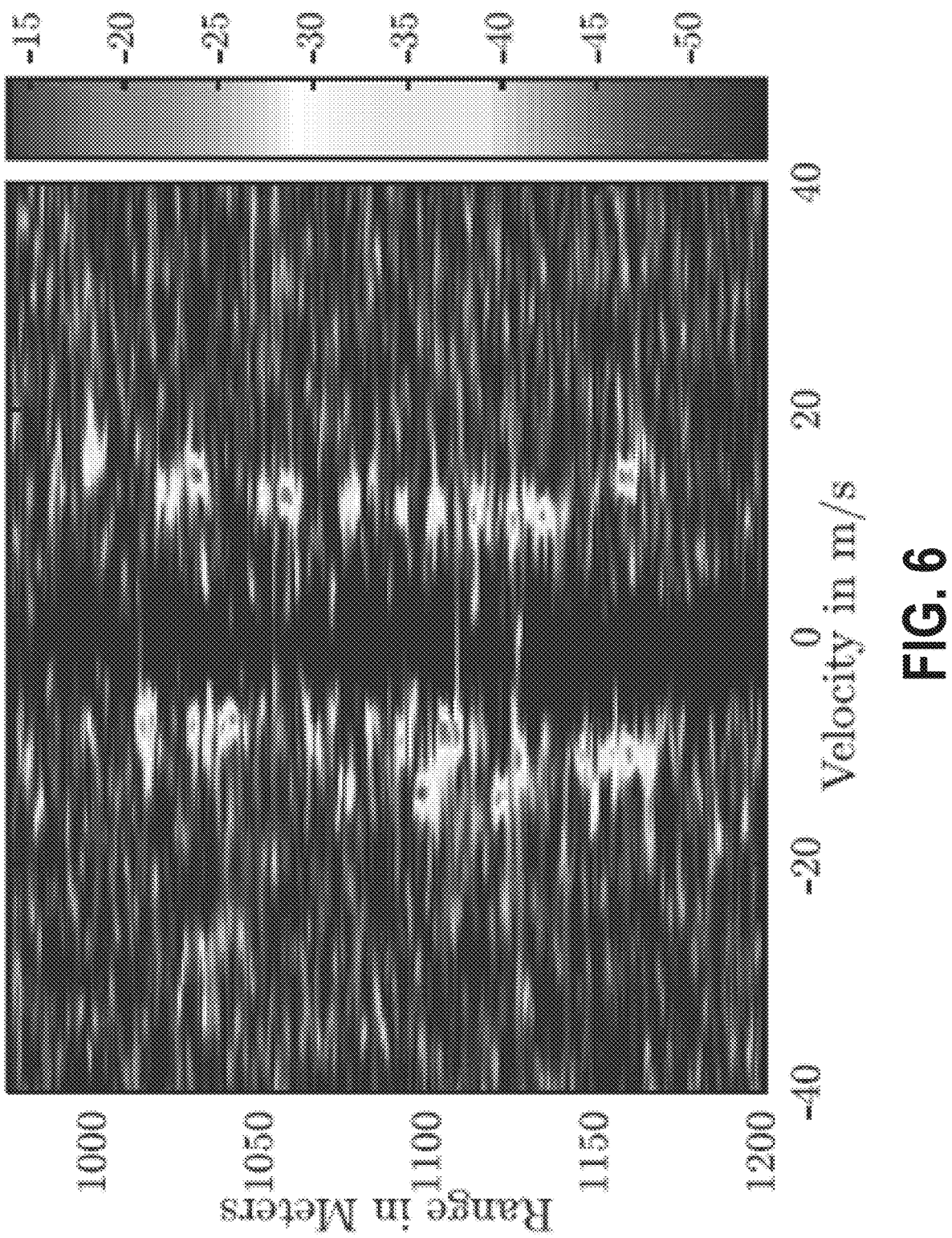
FIG. 6 shows the S-band range-Doppler response obtained using BaSL for 150 random FM waveforms in accordance with the present disclosure.

In FIG. 5, an image illustrating the S-band range-Doppler response obtained using BaSC in accordance with the present disclosure is shown. To obtain the Doppler response shown in FIG. 5, a structured supplementary matrix derived from Equation (20) was used with a BaSC formulation obtained via Equations (8) and (14) to process the 150 random FM waveforms. As shown in FIG. 5, when BaSC according to Equation (14) is applied, the clutter was mostly suppressed, though some leakage was still present due to large clutter discretes. In FIG. 6, an image illustrating the S-band range-Doppler response obtained using BaSL in accordance with the present disclosure is shown. To obtain the Doppler response shown in FIG. 6, a structured supplementary matrix derived from Equation (20) was used with a BaSL formulation obtained via Equation (17) to process the 150 random FM waveforms As shown in FIG. 6, when a BaSL formulation according to Equation (17) was applied the clutter was almost completely removed and the Doppler-sharpened moving targets were plainly visible.

Figure 7:
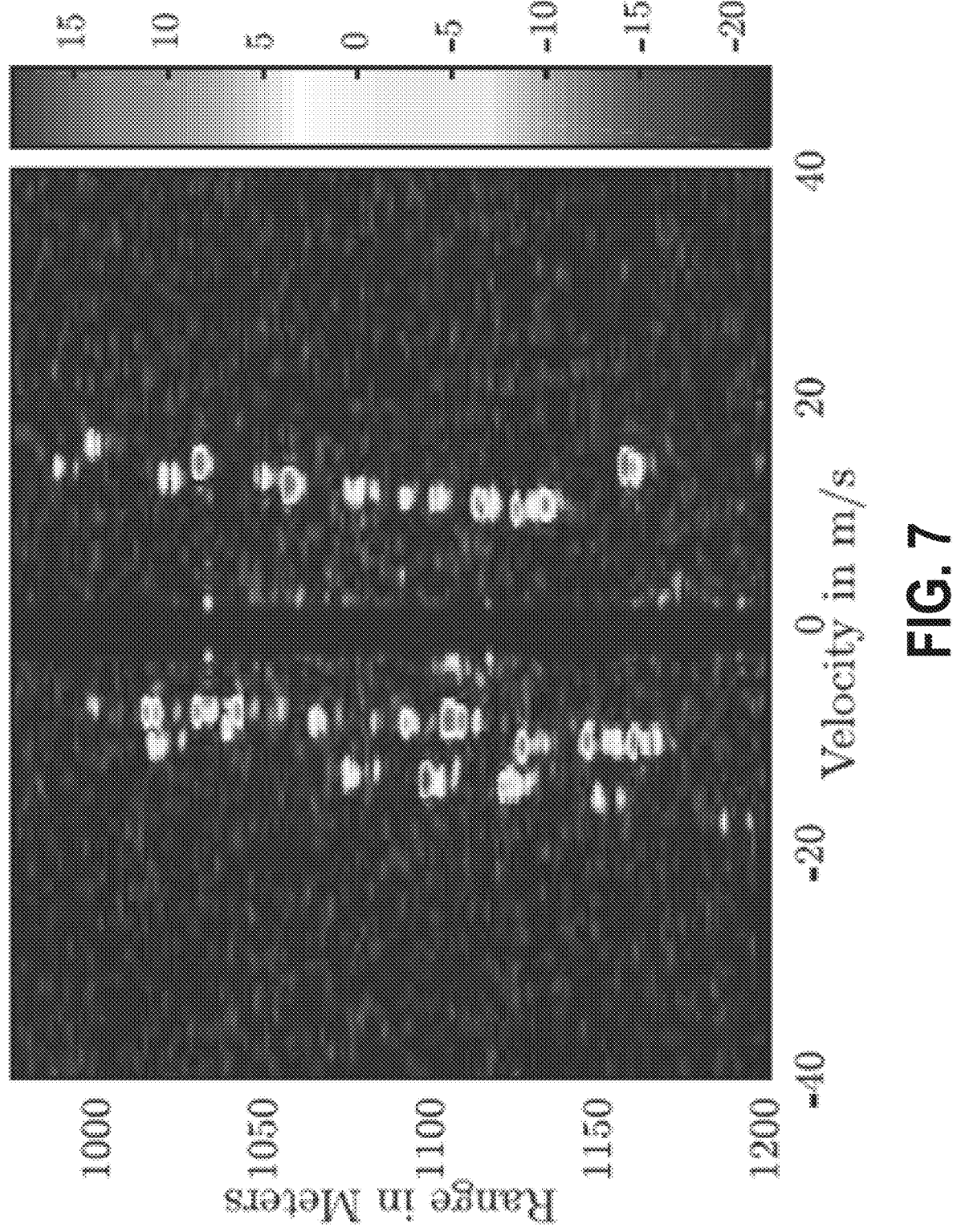
FIG. 7 shows the S-band range-Doppler response with projection-based cancellation and without adaptive estimation for 1000 random FM waveforms.

To serve as a sort of ground truth for comparison, 1000 random FM waveforms were used to illuminate the same scene. In FIG. 7, the S-band range-Doppler response with projection-based cancellation and without adaptive estimation (FFT only) for the 1000 random FM waveforms is shown. After FFT-based Doppler processing and projection-based clutter cancellation the result, as shown in FIG. 7, demonstrates the same set of enhanced targets observed in FIGS. 4-6. Because this latter result enjoys nearly 7 times the number of unique pulses (e.g., 1000 random FM waveforms as compared to 150 random FM waveforms used to obtain the results shown in FIGS. 4-6), the associated SNR and sidelobe decoherence benefits that accompany it (e.g., due to incoherent sidelobe combing for random FM waveforms) are easy to see. More importantly, however, is the very good agreement in moving targets between FIGS. 6 and 7, many of which are not discernible in FIG. 3.

For the second open air test a set of data was collected from a W-band frequency modulation continuous waveform (FMCW) system developed to capture fast-moving objects. The set of data for the second open air test was obtained by firing reusable paintballs away from the receiver and the resulting data was oriented in terms of frequency offset (corresponding to range) on the horizontal axis and (slow) time in milliseconds on the vertical axis (increasing downward). The system used to capture the set of data for the second open air test generated 500 μs chirps that span a bandwidth of 600 MHz at a center frequency of 108 GHz. The operating mode involved up/down chirp cycles, but only the down chirp portions were considered, resulting in an effective PRF of 1 ms. The received echoes from each sweep were dechirped and sampled, followed by standard stretch processing involving an FFT. Here the FFT was also replaced with the RISR/BaSC or RISR/BaSL methods for each sweep. This manner of fast-time adaptive processing is particularly well-suited to this arrangement because the fast-moving object requires that spectral estimation be performed separately for each sweep. Both forms of the supplementary matrix were considered, with the background data collected when the radar was operating prior to the paintball(s) being fired.

Figure 8:
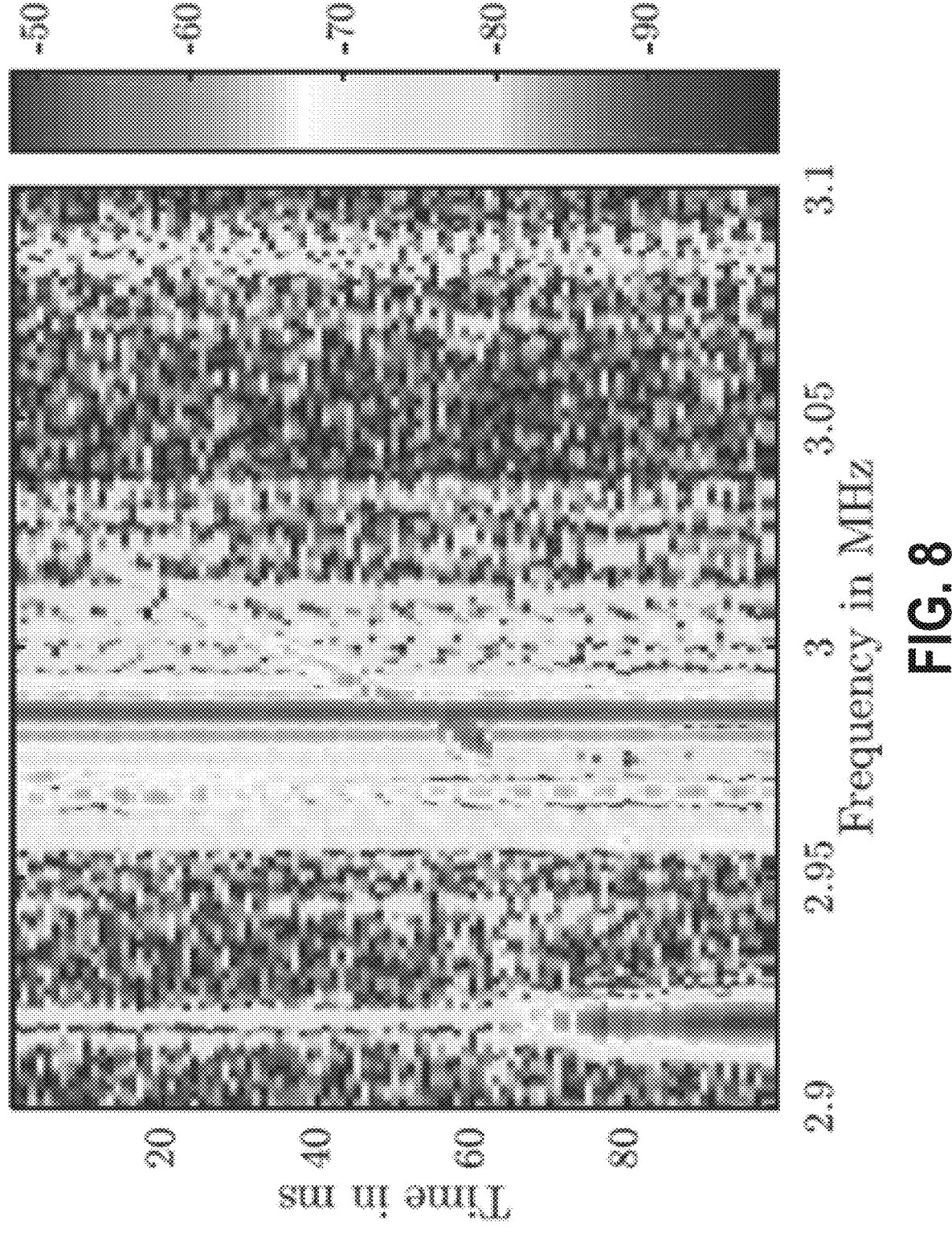
FIG. 8 shows the W-Band dechirped time-history after standard stretch processing.

In FIG. 8, the time-history across a set of FMCW sweeps after each sweep has been dechirped followed by an FFT (i.e. standard stretch processing) is shown. Many of the strong vertical echoes shown in FIG. 8 are background clutter, though the response at 65+ ms at ~2.92 MHz is the vibration of a rubber sheet caused by the paintball impact. Noting that frequency corresponds to range for FMCW, the diagonal paintball trace (more visible in FIGS. 9-12) was actually shifted in frequency due to Doppler, with the near-horizontal response at 61 ms arising from rapid deceleration when the paintball struck the rubber sheet.

Figure 9:
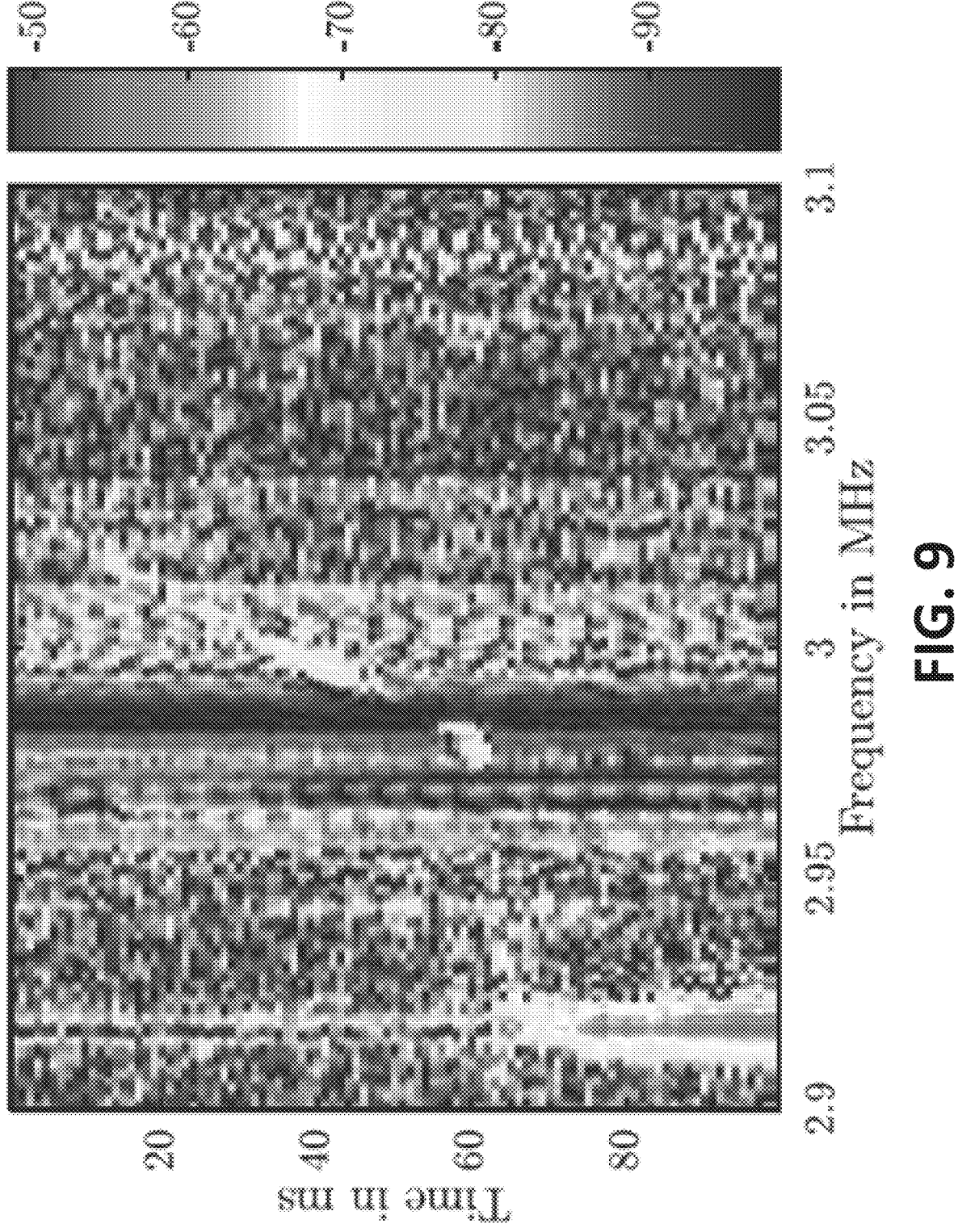
FIG. 9 shows the W-Band dechirped time-history after RISR/BaSC using a structured supplementary matrix.
Figure 10:
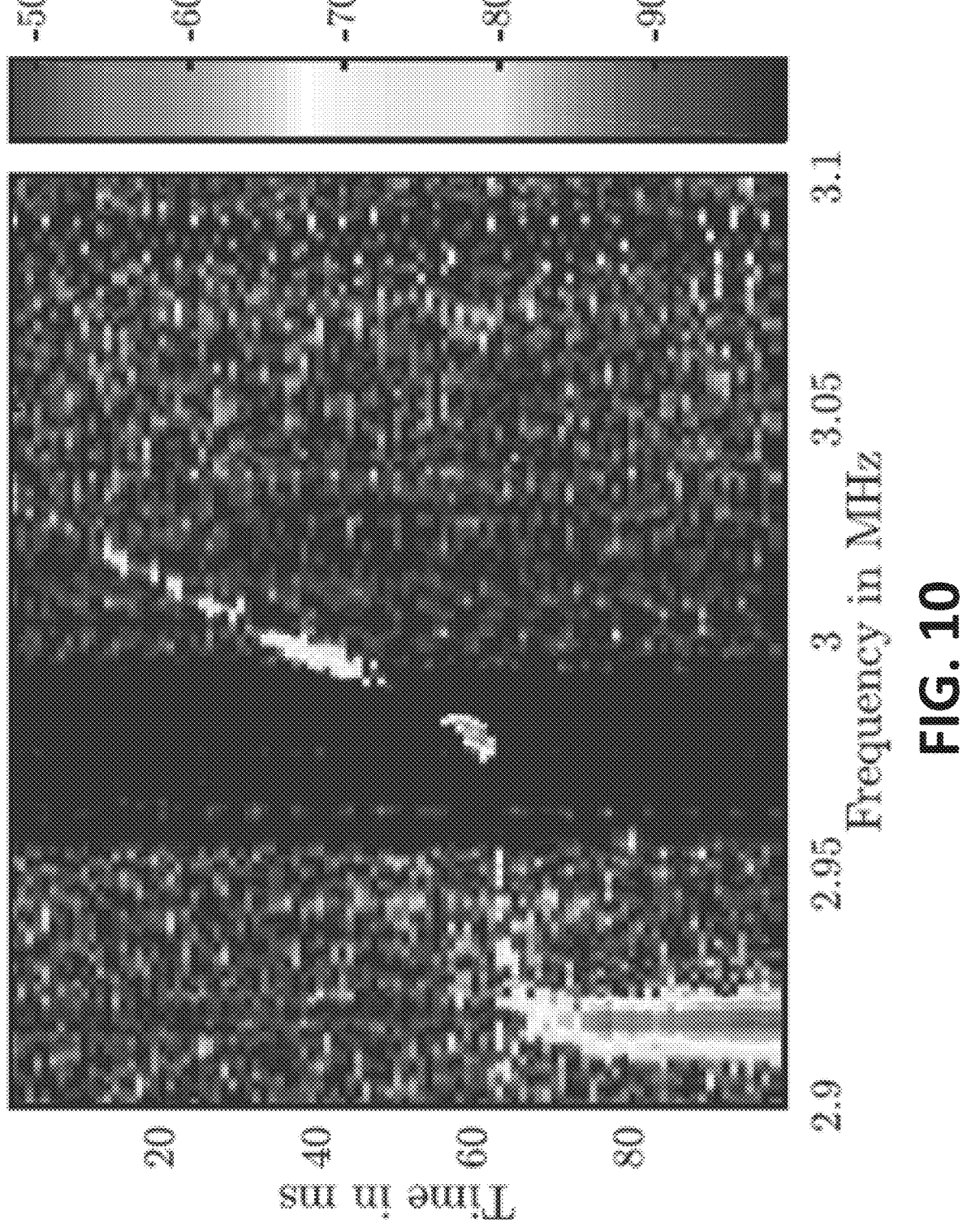
FIG. 10 shows the W-Band dechirped time-history after BaSL using a structured supplementary matrix.

In contrast, FIGS. 9 and 10 illustrate the impact of BaSC and BaSL when the structured supplementary matrix of Equation (20) was employed to suppress the background clutter. In particular, FIG. 9 shows the W-Band dechirped time-history after RISR/BaSC via Equations (8) and (14) using the structured supplementary matrix of (20), and FIG. 10 shows the W-Band dechirped time-history after BaSL via Equation (17) using the structured supplementary matrix of Equation (20). As can be seen in FIGS. 9 and 10, the fast-moving paintball was clearly visible, especially in the BaSL response, due to this fast-time suppression of background clutter.

Figure 11:
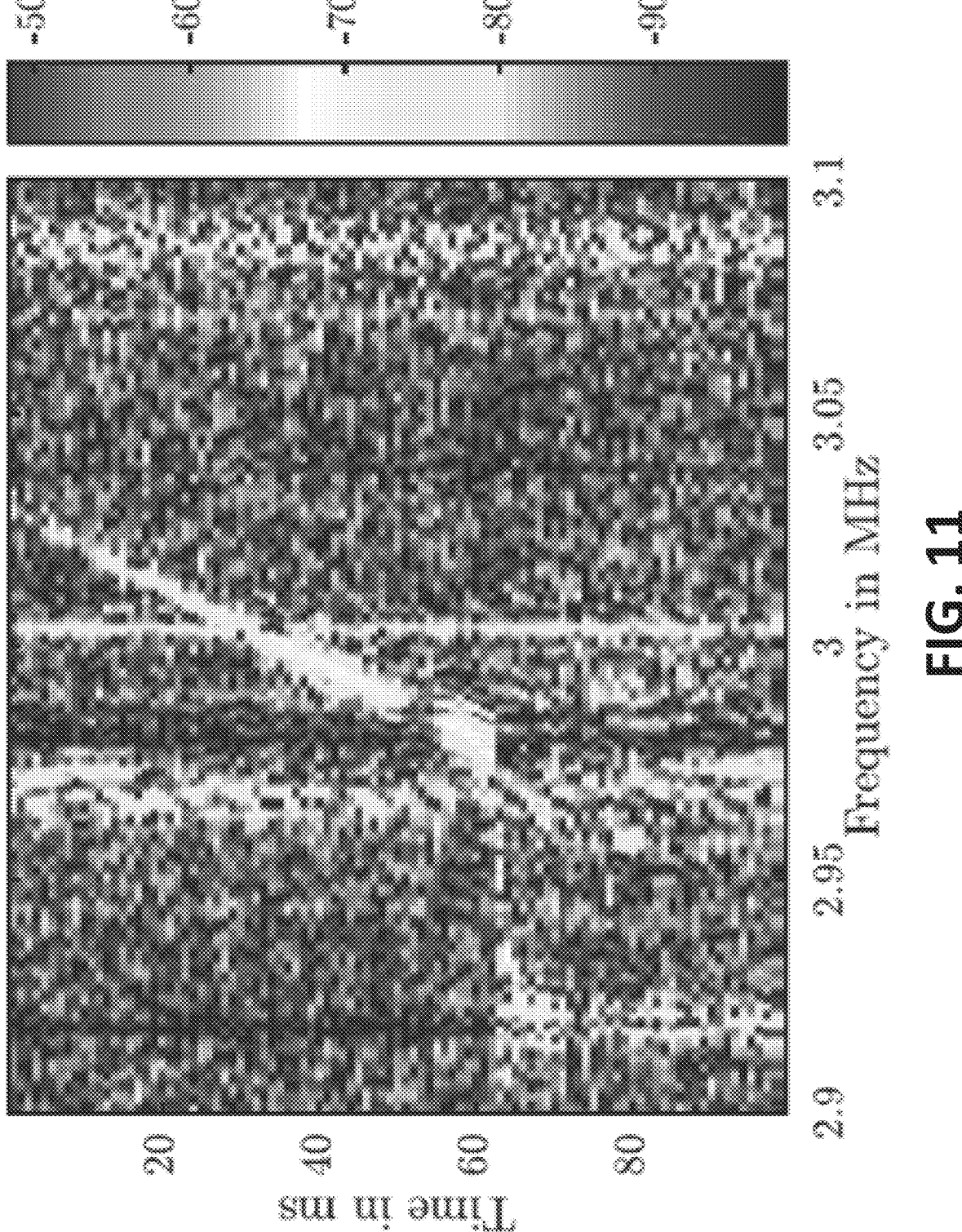
FIG. 11 shows the W-Band dechirped time-history after RISR/BaSC using a sample covariance matrix.
Figure 12:
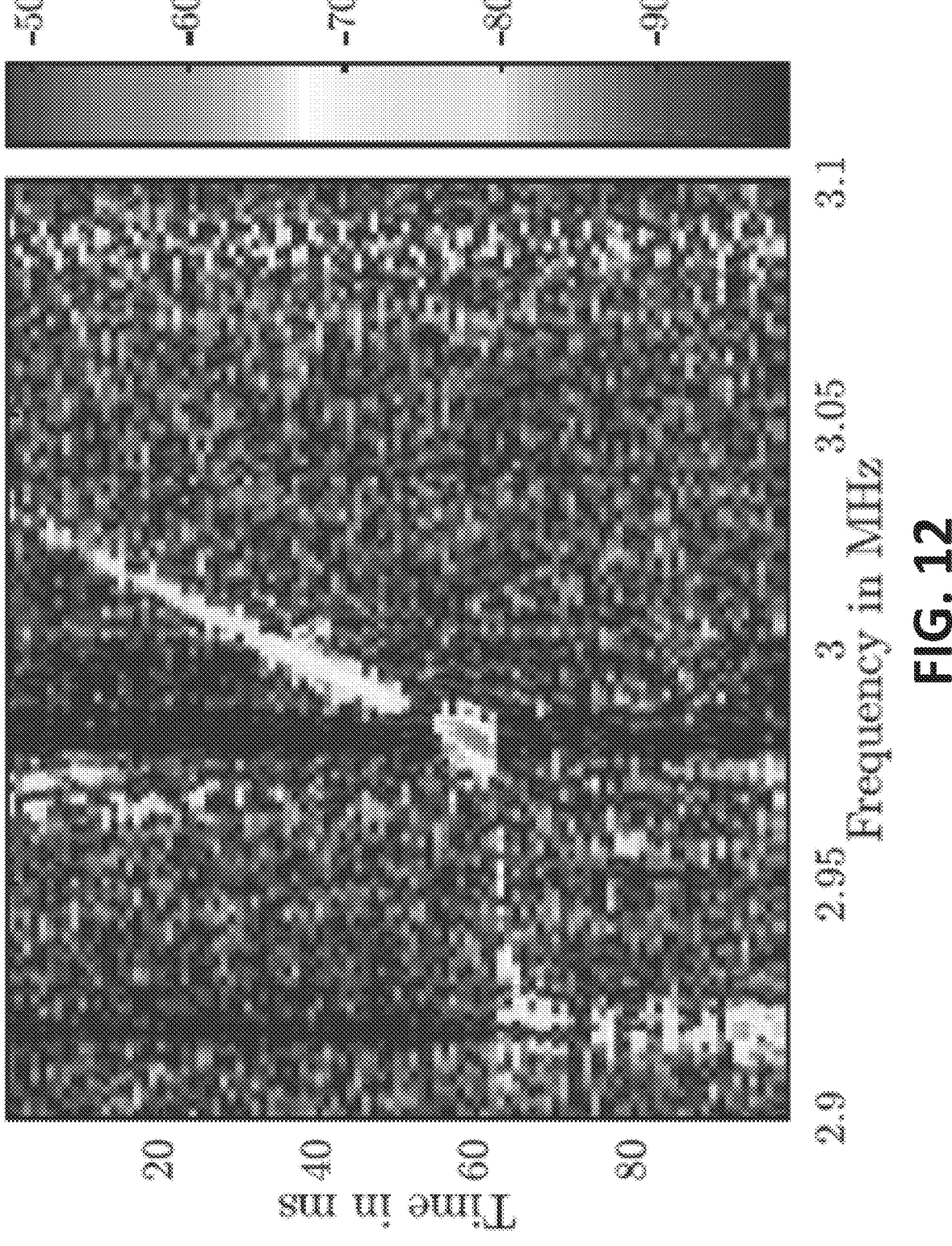
FIG. 12 shows the W-Band dechirped time-history after BaSL using a sample covariance matrix.

Unlike the previous open-air range-Doppler experiment described with reference to FIGS. 2-7, the data for the second open-air range-Doppler experiment was collected inside an auditorium, which presented significant multipath and some modulated clutter effects believed to be caused by ventilation fans. Consequently, the structured supplementary matrix may not adequately capture all of the ambient background clutter. In FIGS. 11 and 12 Doppler responses are shown for BaSC and BaSL, respectively, using a sample covariance matrix according to Equation (19), which provides an alternative perspective on BaSC (from FIG. 9) and BaSL (from FIG. 10). In particular, FIG. 11 shows the W-Band dechirped time-history after RISR/BaSC via Equations (8) and (14) using the sample covariance of Equation (19), while FIG. 12 shows the W-Band dechirped time-history after BaSL via Equation (17) using the sample covariance of Equation (19). While the sheet vibration effect for 65+ ms was less clear, the paintball trajectory was more visible (subjectively speaking). Moreover, the impact at 61 ms was also stronger for both BaSC (by about 6 dB) and BaSL (by about 3 dB).

As described above and shown in FIGS. 2-12, the RMMSE-based approach denoted as RISR, developed for DOA estimation, is likewise applicable to spectral estimation, though it does not inherently address clutter cancellation. Embodiments of the present disclosure demonstrate incorporated this capability via hard and soft implementations, referred to herein as BaSC and BaSL, respectively. As demonstrated using measured S-band and W-band data from the two experimental setups described herein, the corresponding adaptive BaSC and BaSL methods provide significant enhancement for the detection and discrimination of moving targets. Moreover, because it is performed on a per-snapshot basis, the disclosed formulations open the door to new applications of interference cancellation.

Referring to FIG. 13, a flow diagram a flow diagram of an exemplary method for performing radar signal processing in accordance with the present disclosure is shown as a method 1300. In an aspect, the method 1300 may be executed by a radar system, such as the radar device 100 of FIG. 1. In aspects, the method 1300 may be at least partially implemented in software stored as instructions (e.g., the instructions 122 of FIG. 1) that, when executed by one or more processors (e.g., the one or more processors 110 of FIG. 1), cause the one or more processors to perform the operations of the method 1300.

At 1310, the method 1300 includes transmitting, by a radar system, a radar waveform. It is noted that while step 1310 addresses transmitting a radar waveform, it should be understood that a plurality of radar waveforms may be transmitted if desired. At step 1320, the method 1300 includes receiving, by the radar system, a radar waveform return corresponding to the transmitted radar waveform and at step 1330, separating, by the radar system, the radar waveform return into a first component and a second component. The first component may be a clutter component and the second component may be a remainder of the corresponding radar waveform return. As explained above with reference to Equation (9), the remainder of the corresponding radar waveform return may exclude noise.

At step 1340, the method 1300 includes generating, by the radar system, a filter bank based on the first component and the second component. In an aspect, the filter bank may be generated based on a mean-square error (MSE) objective function. For example, the radar system may be configured to operate in accordance with a formulation of RMMSE, such as RISR as described above. At step 1350, the method 1300 includes processing, by the radar system, the radar waveform return based on the filter bank, wherein the processing comprises cancelling clutter based on the first component and performing spectral estimation of the radar waveform return. It is noted that the method 1300 may be implemented using the BaSC approach, where cancelling clutter occurs prior to performing spectral estimation (i.e., clutter cancellation and estimation are performed sequentially), or may be implemented using the BaSL approach, where cancelling clutter and spectral estimation are performed jointly. In some aspects, the clutter component may be incorporated into the filter bank. As explained above, the clutter may be cancelled by projecting the first component onto the orthogonal complement of the clutter subspace. The clutter cancellation may also involve generating a cancellation matrix based on the first component, wherein projecting the first component onto the orthogonal complement of the clutter subspace comprises applying the cancellation matrix to a covariance matrix generated based on the radar waveform return.

At step 1360, the method 1300 includes outputting, by the radar system, information derived from the radar waveform return based on the processing. As described above, the information derived from the radar waveform return based on the processing may include information associated with one or more moving targets of interest. The information output at step 1360 may be provided to a display device, such as the display device 136 of FIG. 1. Additionally or alternatively, the information may be output to a remote device, such as a remote radar system or other external device (e.g., display device). In some aspects, the information may additionally or alternatively be output to a database for storage or to other devices.

As shown above, the method 1300 incorporates the BaSC and BaSL techniques disclosed herein for processing radar waveform returns. As described above, these techniques improve various radar processing techniques, such as RMMSE-based techniques (e.g., RISR, etc.), by incorporating clutter cancellation capabilities. The enhancements provided by the disclosed BaSC and BaSL techniques improve detection of moving targets and reduce the impact of clutter, thereby improving the ability to use RMMSE-based radar processing techniques in MTI radar systems. It is noted that while the method 1300 has been described with reference to receiving and processing a radar waveform return, it should be understood that the method 1300 may be readily utilized to process multiple received radar waveform returns. For example, the steps of the method 1300 may be performed multiple times based on a sequence of radar waveform returns in accordance with the concepts described and illustrated with reference to FIGS. 2-12.

Although the embodiments of the present disclosure and their advantages have been described in detail, it should be understood that various changes, substitutions and alterations can be made herein without departing from the spirit and scope of the disclosure as defined by the appended claims. Further, although the drawings may illustrate some of the concepts disclosed herein as logical or functional blocks, it is to be understood that each of those blocks may be implemented in hardware, software, or a combination of hardware and software. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for processing radar signals, the method comprising:

transmitting, by a radar system, a radar waveform;

receiving, by the radar system, a radar waveform return corresponding to the transmitted radar waveform;

separating, by the radar system, the radar waveform return into a first component comprising clutter associated with stationary signal components and a second component comprising remaining radar waveform return associated with one or more moving targets;

generating, by the radar system, a filter bank based on the separated first component and the second component, wherein the filter bank is a reiterative minimum-mean square error (RMMSE) based adaptive filter bank;

processing, by the radar system, the radar waveform return based on the filter bank, wherein the processing comprises cancelling clutter based on the first component and performing spectral estimation of the radar waveform return; and outputting, by the radar system, information derived from the radar waveform return based on the processing, the information indicating detection of the one or more moving targets, wherein cancelling clutter and performing spectral estimation comprises:

cancelling clutter associated with the stationary signal components prior to performing spectral estimation of the remaining radar waveform return associated with the one or more moving targets when the one or more moving targets have a first speed; and jointly cancelling clutter associated with the stationary signal components and performing spectral estimation of the radar waveform return associated with the one or more moving targets when the one or more moving targets have a second speed less than the first speed.

2. The method of claim 1, wherein the remainder of the corresponding radar waveform return excludes noise.

3. The method of claim 1, wherein the clutter is cancelled by projecting the first component onto an orthogonal complement of a clutter subspace.

4. The method of claim 3, further comprising generating a cancellation matrix based on the first component, wherein projecting the first component onto the orthogonal complement of the clutter subspace comprises applying the cancellation matrix to a covariance matrix generated based on the radar waveform return.

5. The method of claim 1, wherein the clutter component is incorporated into the filter bank.

6. The method of claim 1, comprising updating the filter bank based on subsequent iterations of radar waveform returns, wherein the clutter is canceled based on the subsequent iterations of the radar waveform returns.

7. A system for processing radar signals, the system comprising:

a memory;

a receiver configured to receive radar signals;

a transmitter configured to transmit radar signals;

one or more processors communicatively coupled to the memory, the transmitter, and the receiver, the one or more processors configured to:

generate radar waveforms for transmission by the transmitter;

process radar waveform returns corresponding to the transmitted radar waveforms, the radar waveform returns received by the receiver, the processing comprising:

separate the radar waveform returns into a first component comprising clutter associated with stationary signal components and a second component comprising remaining radar waveform return associated with one or more moving targets;

generate, for each radar waveform return, a filter bank based on the separated first component and the second component, wherein the filter bank is a reiterative minimum-mean square error (RMMSE) based adaptive filter bank;

cancel clutter based on the first component; and perform spectral estimation of the radar waveform returns; and output, by the system, information derived from the radar waveform return based on the processing, the information indicating detection of the one or more moving targets, wherein to cancel clutter and perform spectral estimation comprises:

cancel clutter associated with the stationary signal components prior to performing spectral estimation of the remaining radar waveform return associated with the one or more moving targets when the one or more moving targets have a first speed; and jointly cancel clutter associated with the stationary signal components and perform spectral estimation of the radar waveform return associated with the one or more moving targets have a second speed less than the first speed.

8. The system of claim 7, wherein the remainder of the corresponding radar waveform return excludes noise.

9. The system of claim 7, wherein the clutter is cancelled by projecting the first component onto an orthogonal complement of a clutter subspace.

10. The system of claim 9, the one or more processors configured to generate a cancellation matrix based on the first component, wherein the one or more processors project the first component onto the orthogonal complement of the clutter subspace by applying the cancellation matrix to a covariance matrix generated based on the radar waveform return.

11. The system of claim 7, wherein the clutter component is incorporated into the filter bank.

12. The system of claim 7, the one or more processors configured to update the filter bank based on subsequent iterations of radar waveform returns, wherein the clutter is canceled based on the subsequent iterations of the radar waveform returns.

* * * * *